(12) United States Patent
Vuk et al.

(10) Patent No.: US 9,057,317 B2
(45) Date of Patent: Jun. 16, 2015

(54) SYSTEM AND METHOD FOR ELECTRICAL POWER MANAGEMENT FOR A VEHICLE

(75) Inventors: Carl Thomas Vuk, Denver, IA (US); Bernard Brandt Poore, East Moline, IL (US); Ronnie Dean Stahlhut, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 2019 days.

(21) Appl. No.: 11/923,743

(22) Filed: Oct. 25, 2007

(65) Prior Publication Data

US 2008/0103635 A1 May 1, 2008

Related U.S. Application Data

(60) Provisional application No. 60/854,822, filed on Oct. 26, 2006.

(51) Int. Cl.
*F01P 7/00* (2006.01)
*G05D 23/00* (2006.01)
*G06F 19/00* (2011.01)
*F01P 7/04* (2006.01)
(Continued)

(52) U.S. Cl.
CPC .............. *F01P 7/04* (2013.01); *B60H 1/00828* (2013.01); *B60K 11/06* (2013.01); *B60L 1/003* (2013.01); *F01P 7/048* (2013.01); *F01P 2025/66* (2013.01)

(58) Field of Classification Search
CPC ............ F01P 7/04; F01P 7/042; F01P 7/044; F01P 7/048; F01P 7/08; F01P 7/14; F01P 7/164; F01P 7/167; G06F 1/206; G06F 1/32; G06F 1/3203; G06F 1/3206; G06F 1/3234; G06F 1/3287; G06F 1/20; Y02B 60/10; Y02B 60/12; Y02B 60/1203; Y02B 60/1275

USPC ............ 701/1, 36, 99, 102; 123/41.01, 41.02, 123/41.05, 41.12; 165/41–44, 51; 62/132, 62/133; 180/68.1, 68.3; 700/299–300
See application file for complete search history.

(56) References Cited

U.S. PATENT DOCUMENTS 4,425,766 A * 1/1984 Claypole .......................... 62/133
4,977,862 A * 12/1990 Aihara et al. ............... 123/41.12
(Continued)

FOREIGN PATENT DOCUMENTS

JP 2005069203 A * 3/2005 ................ F01P 7/04

OTHER PUBLICATIONS

Galitsky, Christina et al. "Energy efficiency improvement and cost saving opportunities for the vehicle assembly industry". In R&D Project Technical Report LBNL-50939 (TRN US200309%%333), Published Feb. 17, 2003. <URL: http://www-library.lbl.gov/docs/LBNL/509/39/PDF/LBNL-50939.pdf>.

*Primary Examiner* — Jack W Keith
*Assistant Examiner* — Chuong P Nguyen
(74) *Attorney, Agent, or Firm* — Yee & Associates, P.C.

(57) ABSTRACT

A system and method for managing the electrical power associated with a vehicle detects whether an engine speed is below a speed set point for a minimum duration. A thermal sensor is arranged to detect whether a first temperature associated with a first cooling fan, a first coolant, or a first vehicle component is below a first target temperature. A fan controller or a power management controller is configured to disable or slow the first cooling fan to conserve a first level of electrical energy if the first temperature is below a target temperature and if the engine speed is below the speed set point for a minimum duration.

10 Claims, 10 Drawing Sheets

(51) Int. Cl.
  *B60H 1/00* (2006.01)
  *B60K 11/06* (2006.01)
  *B60L 1/00* (2006.01)

(56) References Cited

U.S. PATENT DOCUMENTS

| | | | |
|---|---|---|---|
| 5,050,395 A * | 9/1991 | Berger | 62/133 |
| 5,094,198 A * | 3/1992 | Trotta et al. | 123/179.21 |
| 5,133,302 A * | 7/1992 | Yamada et al. | 123/41.12 |
| 5,307,644 A * | 5/1994 | Cummins et al. | 62/133 |
| 5,359,969 A * | 11/1994 | Dickrell et al. | 123/41.12 |
| 5,546,755 A * | 8/1996 | Krieger | 62/133 |
| 5,584,371 A * | 12/1996 | Kelledes et al. | 192/58.61 |
| 5,947,248 A * | 9/1999 | Link | 192/84.1 |
| 6,045,482 A * | 4/2000 | Nishar et al. | 477/107 |
| 6,443,105 B2 * | 9/2002 | Oishi | 123/41.12 |
| 6,453,853 B1 * | 9/2002 | Hawkins et al. | 123/41.12 |
| 6,772,714 B2 * | 8/2004 | Laird et al. | 123/41.12 |
| 7,051,786 B2 | 5/2006 | Vuk | |
| 7,347,168 B2 * | 3/2008 | Reckels et al. | 123/41.11 |
| 7,415,945 B2 * | 8/2008 | Tuttle | 123/41.11 |
| 2003/0172883 A1 * | 9/2003 | Shiozaki et al. | 123/41.12 |
| 2006/0185626 A1 * | 8/2006 | Allen et al. | 123/41.12 |
| 2007/0016355 A1 * | 1/2007 | Kamado et al. | 701/103 |
| 2009/0236089 A1 * | 9/2009 | Major et al. | 165/299 |
| 2010/0293923 A1 * | 11/2010 | Yokoi | 60/273 |

\* cited by examiner

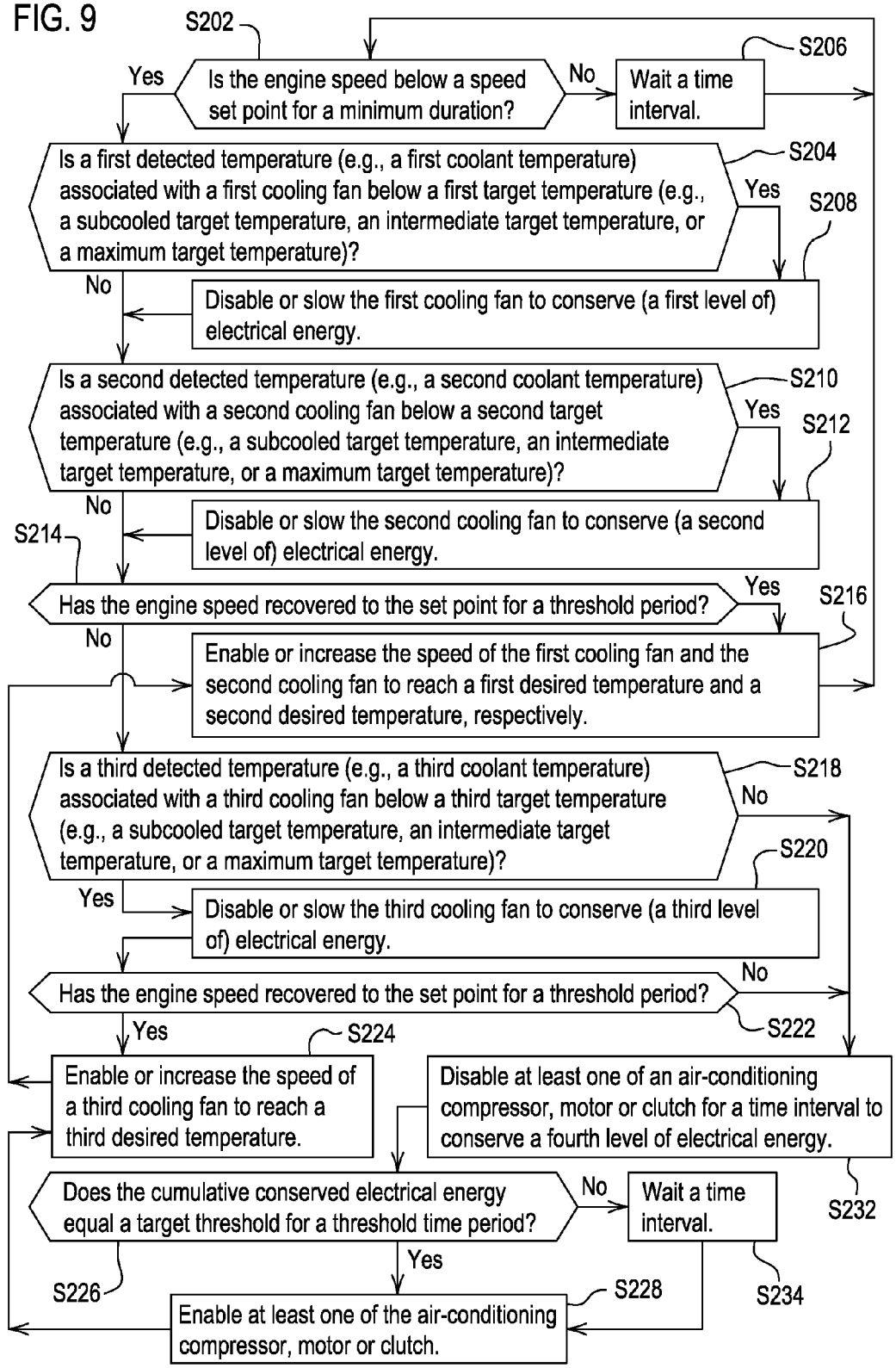

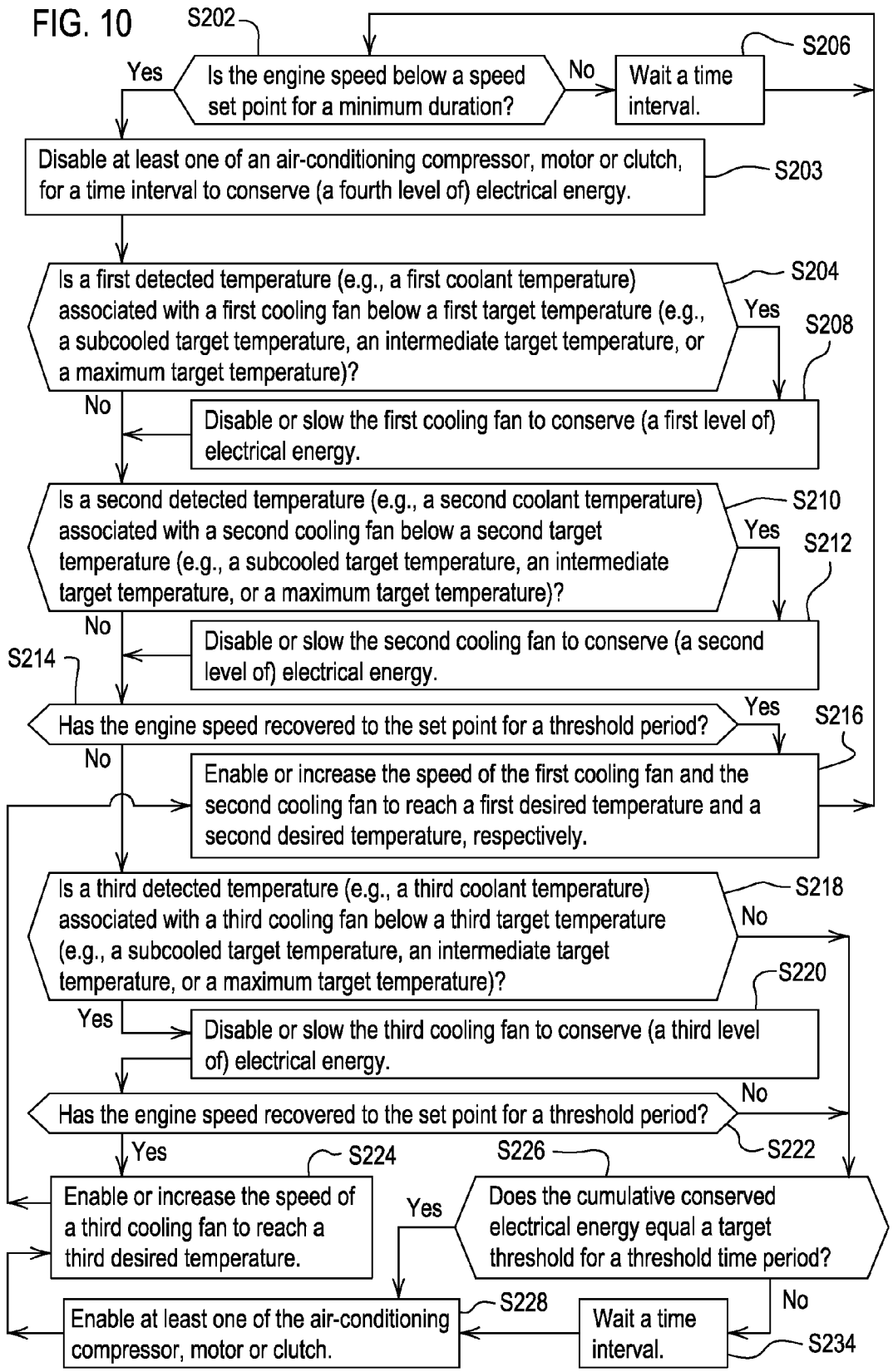

SYSTEM AND METHOD FOR ELECTRICAL POWER MANAGEMENT FOR A VEHICLE

This document (including all drawings) claims priority based on U.S. provisional application Ser. No. 60/854,822, filed Oct. 26, 2006, under 35 U.S.C. 119(e).

FIELD OF THE INVENTION

This invention relates to a system and method for electrical power management for a vehicle.

BACKGROUND OF THE INVENTION

A vehicle may be propelled by an electric drive motor, an engine, or both. In certain industrial, construction, earth-moving, transportation, mass-transit, mining, agricultural, and other applications of drive trains, the load on the engine or drive motor may fluctuate. For example, for many applications, the load on the engine of a hybrid vehicle may increase as the vehicle travels up a hill or up sloped terrain. Accordingly, there is a need to provide sufficient electric energy to the electric drive motor to compensate for such fluctuations in load.

SUMMARY OF THE INVENTION

In accordance with one aspect of the invention, a system and method for managing the electrical power associated with a vehicle detects whether an engine speed is below a speed set point for a minimum duration. A thermal sensor is arranged to detect whether a first temperature associated with a first cooling fan, a first coolant, or a first vehicle component is below a first target temperature. A fan controller or a power management controller is configured to disable or slow the first cooling fan to conserve a first level of electrical energy if the first temperature is below a target temperature and if the engine speed is below the speed set point for a minimum duration.

BRIEF DESCRIPTION OF THE DRAWINGS

FIG. 9 is a flow chart of one embodiment for a method for managing electrical power for a vehicle.

FIG. 10 is a flow chart of another embodiment for a method for managing electrical power for a vehicle.

DESCRIPTION OF THE PREFERRED EMBODIMENT

As used throughout this document, the following terms shall have the following definitions:

(1) "Electrical energy" refers generally to any voltage, any current, any power, any energy in electrical form, or any work in electrical form that is received, generated, stored, conserved, transferred, managed, switched, consumed or available. Any level of electrical energy depends upon how the electrical energy is measured. For example, electrical power or conserved electrical power may be measured in accordance with one or more of the following: (a) Watts, (b) Joules per second, or (c) the product of volts and amperage. Electrical work or conserved electrical energy may be measured in Watts-hour or Joules, for instance.

(2) "Coolant" may comprise oil, synthetic oil, anti-freeze, water, an alcohol-based solution, ethylene glycol aqueous solution, hydraulic fluid, a lubricant or a lubricating coolant. Each coolant may function properly within a corresponding operational range of temperatures.

(3) "A sub-cooled target temperature" refers to a temperature (of a component, device, system or coolant associated therewith) that is generally below the normal operational temperature or operational temperature range (e.g., of a component, device, system or coolant associated therewith) to provide a thermal safety margin or sub-cooled storage reservoir for enhanced heat dissipation. The degree of storage for later enhanced heat dissipation may depend upon the mass, surface area and thermal properties of the component, device, system and coolant. It is understood that the sub-cooled target temperature will ordinarily not be below the ambient environmental temperature of the engine 34, unless a heat pump, an air-conditioning system or other mechanism is used.

(4) "Maximum target temperature" means a maximum operational temperature (of a component, device, system or coolant associated therewith) within the specifications (of a component, device, system or coolant associated therewith), above which thermal damage, performance degradation or both may result. The maximum target temperature may vary with the design, manufacturer and specifications of a component, device, system or coolant associated therewith.

(5) "Intermediate target temperature" means a intermediate temperature (of a component, device, system or coolant associated therewith) between the sub-cooled target temperature and the maximum target temperature for a particular vehicle component or system.

Figure 1:
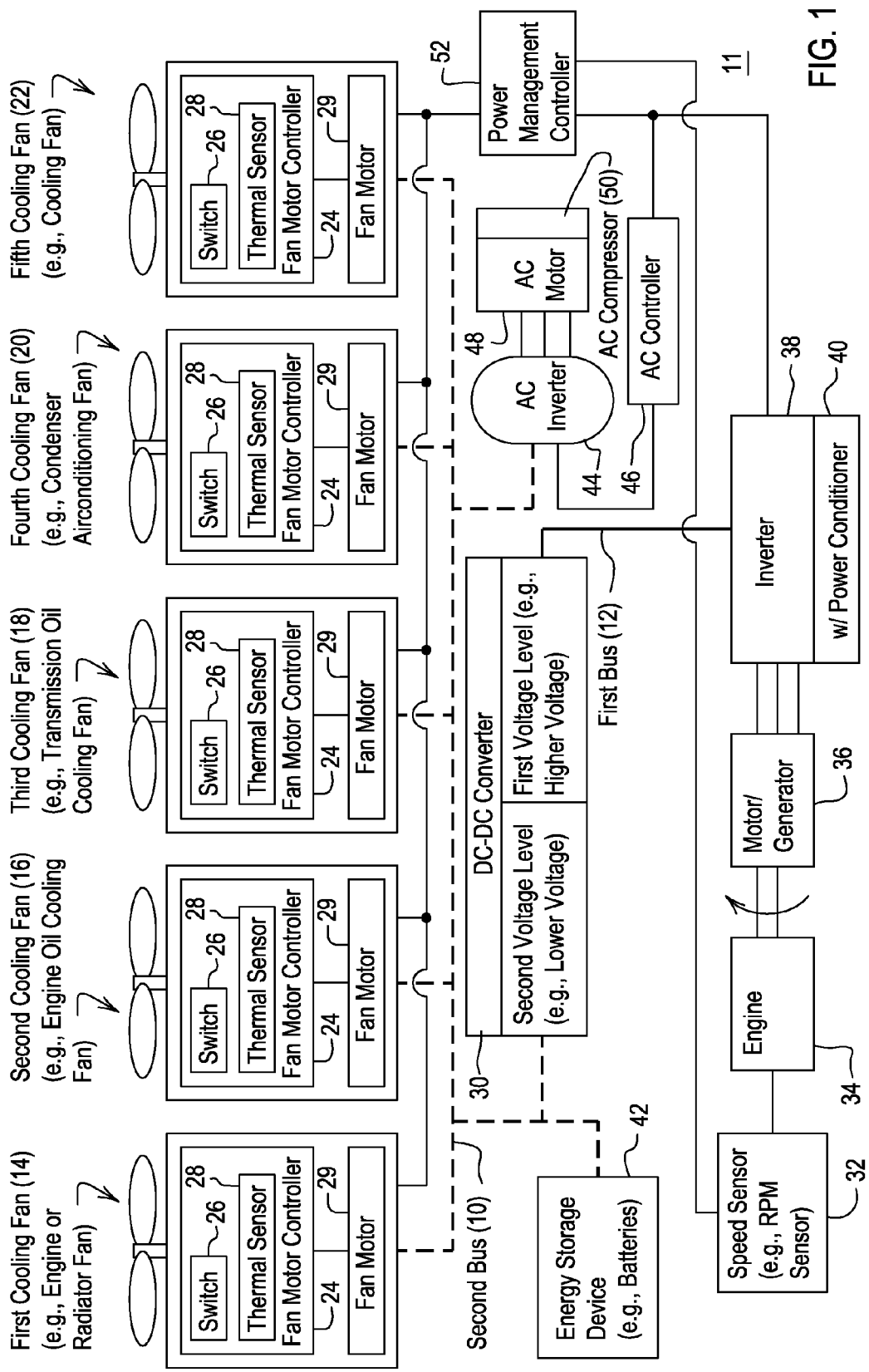
FIG. 1 is a block diagram of a first embodiment of a system for managing electrical power for a vehicle.

In accordance with one embodiment, FIG. 1 shows a system 11 comprising an engine 34 that is associated with a motor/generator 36. A speed sensor 32 (e.g., revolution per unit time sensor or revolutions per minute (RPM) sensor) measures a rotational speed of an engine shaft (e.g., a crankshaft) or provides an indicator of a load on the engine 34. An electrical output of the motor/generator 36 is coupled to an inverter 38. In one embodiment, the inverter 38 is associated with a power conditioner 40 for filtering the electrical energy applied to the first bus 12.

The inverter output or first bus 12 is fed to a converter 30 (e.g., a direct current to direct current converter 30). The converter 30 reduces a first voltage level associated with the first bus 12 to a second voltage level associated with the second bus 10. For example, the converter 30 may comprise a voltage divider. The second bus 10 is coupled to one or more cooling fans (14, 16, 18, 20 and 22). The second bus 10 is associated with an energy storage device 42 (e.g., batteries) for storing electrical energy generated by the motor/generator 36.

Each cooling fan (14, 16, 18, 20 and 22) comprises a fan motor controller 24 and a corresponding fan motor 29. In one embodiment, the fan motor controller 24 includes a switch 26 and a thermal sensor 28. As shown in FIG. 1, the cooling fans (14, 16, 18, 20, and 22) include one or more of the following:

a first cooling fan 14 (e.g., an engine or radiator fan), a second cooling fan 16 (e.g., an engine oil cooling fan), a third cooling fan 18 (e.g., a transmission oil cooling fan), a fourth cooling fan 20 (e.g., air-conditioner fan), and a fifth cooling fan 22 (e.g., electronic cooling fan). Each cooling fan (14, 16, 18, 20 and 22) may receive electric energy via the second bus 10.

An air-conditioning inverter 44 is coupled to the second bus 10. In turn, the inverter 44 provides an inverter output (e.g., alternating current signal) to an air-conditioning motor 48 for driving an air-conditioning compressor 50. An air-conditioning controller 46 controls at least one of the inverter 44, the motor 48, and the compressor 50. However, the power management controller 52 may seize supervisory control of one or more of the following: the air-conditioning controller 46, the inverter 44, the motor 48, and the compressor 50.

The power management controller 52 receives input data from the speed sensor 32, the inverter 38, or both. The power management controller 52 generally outputs a control signal or control data to the air-conditioning controller 46 and one or more of the fan motor controllers 24 or cooling fans (14, 16, 18, 20, 22).

In a power generation mode, the engine 34 provides rotational energy to the motor/generator 36 that acts as a generator to generate electrical energy. In the power generation mode, the inverter 38 may operate as a rectifier to rectify alternating current generated by the motor/generator 36 for the first bus 12. Accordingly, the inverter 38 may provide a direct current signal to the first bus 12. In a propulsion mode or motor mode, the motor/generator 36 acts as a motor to assist or supplement the rotational energy output of the engine 34. In the propulsion mode, the inverter 38 may invert the direct current voltage on the first bus 12 to an alternating current (e.g., of one or more phases) suitable to drive the motor/generator 36. In the propulsion mode, the motor/generator 36 consumes at least part of the electric energy on the first bus 12, whereas in the power generation mode, the motor/generator 36 generators at least part of the electrical energy on the first bus 12.

During a power boost mode or power diversion mode, which are used interchangeably herein, a power management controller 52 reduces the electrical power available for one or more cooling fans (14, 16, 18, 20, 22). The cooling fans (14, 16, 18, 20, 22) comprise an engine fan, a transmission oil cooling fan, an engine oil cooling fan, among other possible cooling fans. In an alternate embodiment, the power management controller 52 may reduce the electrical power available for the air-conditioning compressor motor 48, such that the conserved electrical power can be routed or diverted to a traction drive motor (e.g., motor/generator 36) or another higher priority electric motor (e.g., for an implement, thresher, or mower).

The power boost mode may be active if two conditions are satisfied: (a) an operator turns on a switch 26, and (b) a triggering event or condition is present. For example, the triggering event may comprise achieving a certain engine revolutions per unit time over a time interval or achieving a certain generator output (e.g., voltage or current threshold), which may be proportional to engine 34 revolutions per unit time (e.g., revolutions per minute). The power boost mode or power division mode is generally limited to a maximum time duration by a timer (e.g., to avoid over-heating of the engine 34, thermal problems, or uncomfortable air temperature in the cabin or cockpit of the vehicle).

If the vehicle is operated in its normal operational mode or non-power-boost mode, the cooling fans are triggered by the fan motor controller 24. The fan motor controllers 24 may comprise thermostatic controllers. For example, in the normal operational mode, the fan motor controller 24 may switch the fan motor 29 off via the switch 26 if the thermal sensor 28 indicates that the sensed region or zone is below a threshold temperature; the fan motor controller 24 may switch the fan motor 29 on via the switch 26 if the thermal sensor 28 indicates that the sensed region or zone is at or above a threshold temperature. The threshold temperature may be set by a user, at the factory, or otherwise. The sensed region or zone may represent a region associated with the engine, a radiator, an oil cooler, an engine transmission cooler, an air-conditioning system, or another vehicle system or component.

Figure 2:
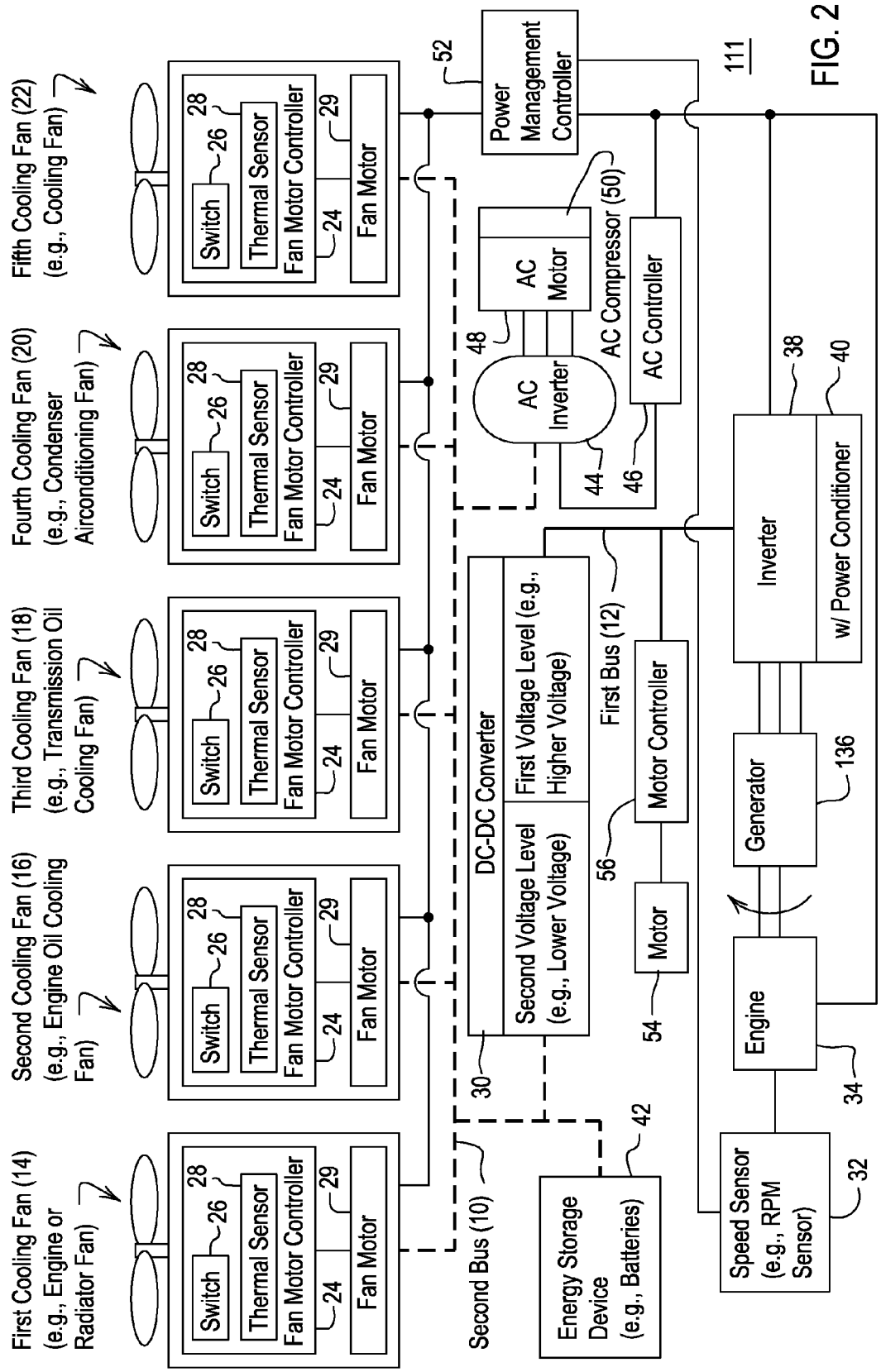
FIG. 2 is a block diagram of a second embodiment of a system for managing electrical power for a vehicle.

The system 111 of FIG. 2 is similar to the system 11 of FIG. 1, except the system 11 of FIG. 2 replaces the motor/generator 36 with a generator 136 and adds a motor 54 and a motor controller 56. Like reference numbers in FIG. 1 and FIG. 2 indicate like elements.

The motor controller 56 is coupled to the first bus 12. In turn, the motor controller 56 is coupled to an electric motor 54. The electric motor 54 may be used to propel the vehicle or to provide rotational mechanical energy to a cutter, mower, thresher, grinder, or other implement. The motor 54 may comprise any direct current or alternating current motor.

The motor controller 56 provides a suitable control data or control signal to control the motor speed of the motor 48, for example. If the motor 54 comprises a direct current motor, the motor controller 56 may vary the motor voltage to control the speed of the motor 54. However, if the motor 54 comprises an alternating current motor, the motor controller 56 may comprise a chopper, inverter, or another device that varies the frequency of the control signal or its modulation (e.g., pulse width modulation) to a control the speed of the motor 54.

Figure 3:
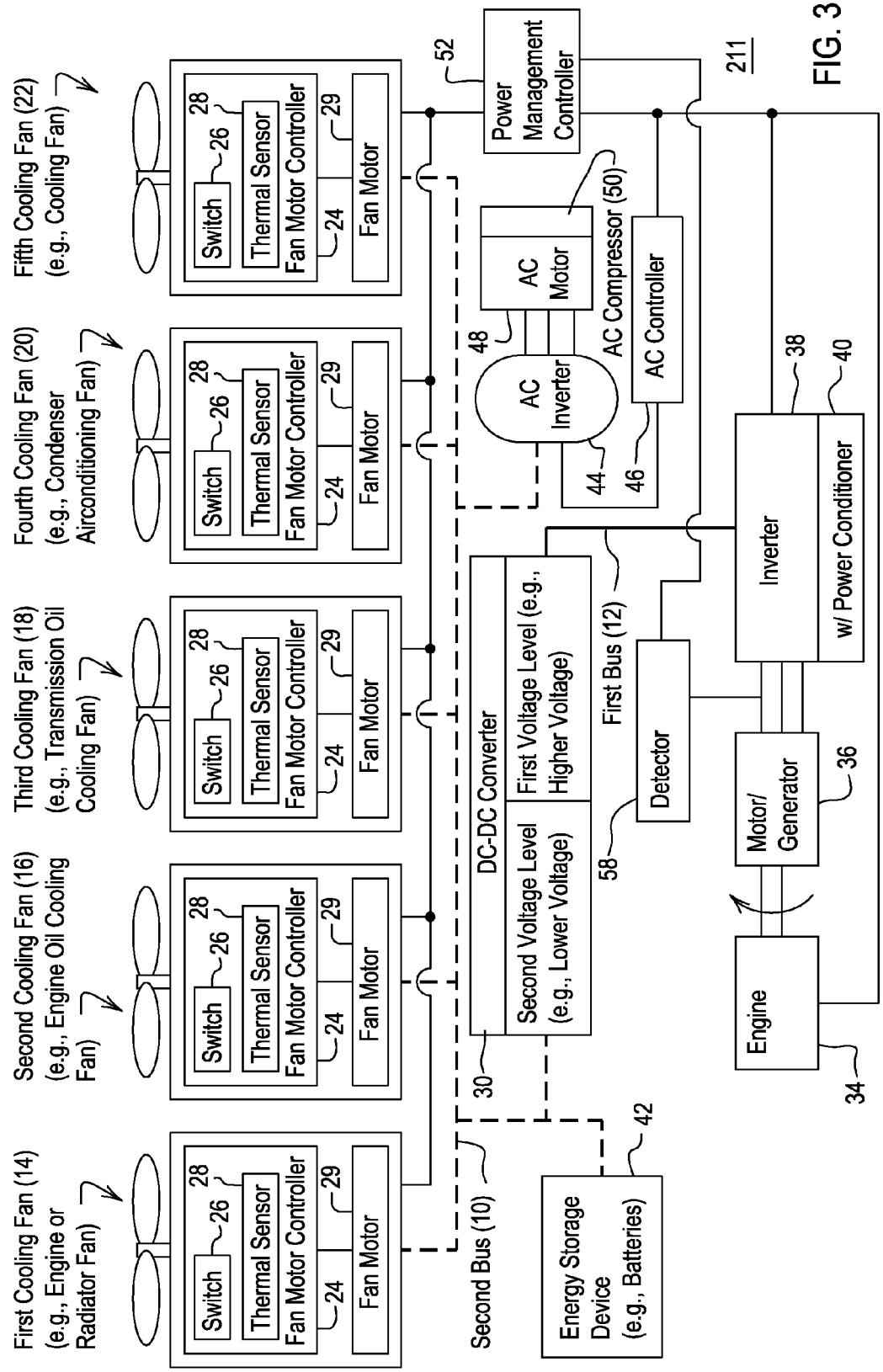
FIG. 3 is a block diagram of a third embodiment of a system for managing electrical power for a vehicle.

The system 211 of FIG. 3 is similar to the system 11 of FIG. 1, except the system 211 of FIG. 3 replaces the speed sensor 32 with a detector 58. Like reference numbers in FIG. 1 and FIG. 3 indicate like elements.

The detector 58 may comprise a voltage level detector, a voltage meter, a current detector, a current meter, or a power level detector associated with a generator output of the motor/generator 36 when the motor/generator 36 is operating in the power generation mode. The detector 58 may provide an indication of the range of revolutions per unit time in which the engine 34 is operating or the load under which the engine 34 is operating. For example, if the detector 58 detects a target electrical range (e.g., within a voltage level range or current level range prior to regulation or limiting) at the generator output meeting or exceeding a threshold voltage level for an evaluation time interval, the detector 58 may determine that the engine 34 is operating within a respective target range of revolutions per unit time. The target electrical range may represent one or more of the following: a detected voltage above a threshold voltage level, a detected current above a threshold current level, a detected power above a threshold power level, a voltage level range, a current level range, and a power level range. Further, if the engine 34 is operating within the target electrical range, the power management controller 52 may decide to operate in the second mode (e.g., the power diversion mode or power boost mode) or to continue operating in the second mode, unless a maximum time or thermal limit is exceeded.

Figure 4:
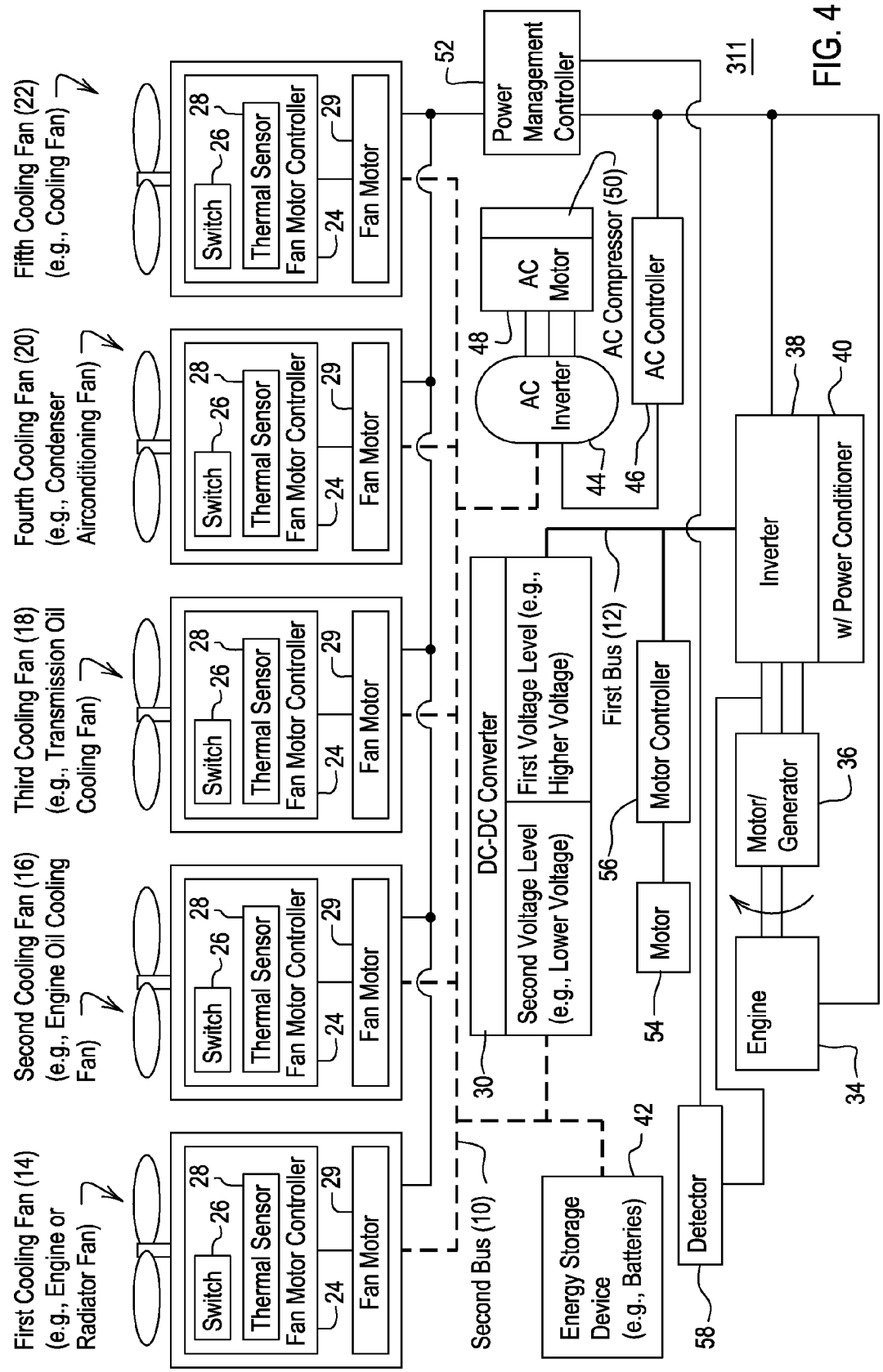
FIG. 4 is a block diagram of a fourth embodiment of a system for managing electrical power for a vehicle.

The system 311 of FIG. 4 is similar to the system 211 of FIG. 3, except the system 311 of FIG. 4 further replaces the motor/generator 36 with a generator 136 and adds a motor 54 and a motor controller 56. Like reference numbers in FIG. 2, FIG. 3, and FIG. 4 indicate like elements.

The motor controller 56 is coupled to the first bus 12. In turn, the motor controller 56 is coupled to an electric motor 54. The electric motor 54 may be used to propel the vehicle or to provide rotational mechanical energy to a cutter, mower, thresher, grinder, or other implement.

Figure 5:
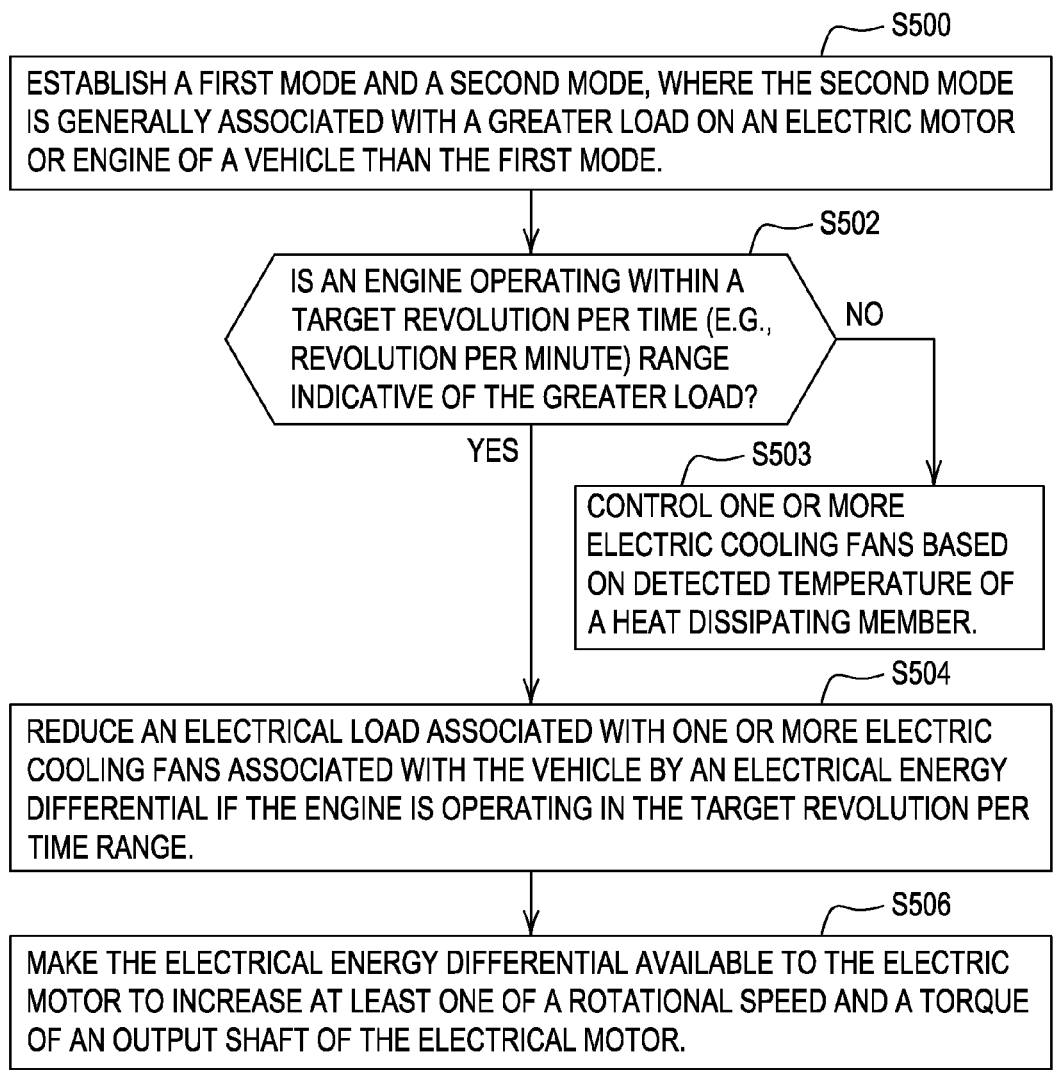
FIG. 5 is a flow chart of one embodiment of a method for managing electrical power for a vehicle.

FIG. 5 describes a method for managing electrical power for a vehicle. The method of FIG. 5 begins in step S500.

In step S500, a power management controller 52 establishes a first mode (e.g., a normal operational mode) and a second mode (e.g., power boost or power diversion mode), where the second mode is generally associated with a greater load on an electric motor (e.g., motor/generator 36 or motor 54) or engine 34 of a vehicle than the first mode. In one embodiment, the first mode comprises a normal operational mode and the second mode comprises a power boost mode or power diversion mode.

In step S502, a speed sensor 32 or detector 58 determines if an engine 34 is operating within a target range of revolutions per time (e.g., revolutions per minute) indicative of the greater load during a time interval or time period. In one embodiment, the detection of the target range of revolutions per unit time for a certain minimum time period indicates the engine 34 is under or is approaching a peak load condition.

In accordance with one illustrative technique for executing step S502, the detector 58 monitors an electrical voltage output of a generator (e.g., 36 or 136) to detect whether the engine 34 is operating in the target range of revolutions per unit time. In accordance with another illustrative technique, the detector 58 monitors a current output or power output of a generator (e.g., 36 or 136) to detect whether the engine 34 is operating in the target range of revolutions per unit time. If the speed sensor 32 or detector 58 determines that the engine 34 is operating within the target range indicative of a greater load, the method continues with step S504. However, if the speed sensor 32 or detector 58 determines that the engine 34 is operating at less than or below the target range, the method continues with step S503.

In step S504, a power management controller 52, a fan motor controller 24, or both may reduce an electrical load associated with one or more electric cooling fans associated with the vehicle by an electrical energy differential. Step S504 may be carried out in accordance with various procedures, which may be applied alternately or cumulatively.

Under a first procedure for carrying out step S504, the power management controller 52 remains in or enters into the second mode (e.g., a power boost mode or power diversion mode). In the first mode, the power management controller 52 defers to one or more fan motor controllers 24 to control operation of the cooling fans. For example, in the first mode, the fan motor controllers 24 determine whether the corresponding cooling fans (14, 16, 18, 20, 22) are on or off.

Under a second procedure for carrying out step S504, the power management controller 52, an air-conditioning controller 46, or both may deactivate an air-conditioning motor 48 that drives a compressor 50 to conserve additional energy to further reduce the electrical load. For instance, the power management controller 52 may reduce an electrical load associated with a compressor motor 48 for driving an air conditioning compressor 50 by a supplemental energy differential.

In step S503, a power management controller 52, a fan motor controller 24, or both control one or more electric cooling fans (14, 16, 18, 20, 22) based on a detected temperature of a heat dissipating member. The heat dissipating member may comprise one or more of the following: an engine 34, an electric motor (36 or 136), a radiator, an engine oil cooler, a transmission oil cooler, an air conditioner condenser, a motor controller, a heat sink, an inverter, a converter, a rectifier, electronics, and a cooling fan. The detected temperature may be detected by a thermal sensor 28, a thermometer, a thermostat, a thermister, or another device that changes a physical or electrical property based on a change in temperature. The power management controller 52, a fan motor controller 24, or both may activate one or more electric cooling fans in the first mode based on a detected temperature exceeding a corresponding threshold temperature.

In one embodiment, step S503 represents the first mode or normal operational mode. In the first mode, the power management controller 52 defers to one or more motor controllers 24 to control operation of the cooling fans. For example, in the first mode, the fan motor controllers 24 determine whether the corresponding cooling fans (14, 16, 18, 20, 22) are on or off.

In step S506, a power management controller 52 makes an electrical energy differential available to the electric motor (e.g., 36 or 136) to increase at least one of a rotational speed and a torque of an output shaft of the electric motor (e.g., 36 or 136). In addition, the power management controller 52 may make a supplemental energy differential (e.g., associated with reducing power consumption and air-conditioning of the air conditioning system) available to the electric motor to increase at least one of a rotational speed and a torque of the output shaft of the electric motor. The supplemental energy differential is available or accrued by deactivating a compressor motor 48 that drives a compressor 50 of an air conditioning system. In one example, the electric motor comprises a drive motor (36 or 136) for directly or indirectly driving one or more wheels, tracks, propellers, turbines, or a propulsion member of a vehicle directly or via a transmission or gear assembly. In another example, the electric motor is arranged to provide rotational energy to an electrically driven power takeoff shaft (PTO) of the vehicle. For instance, the electric motor is arranged to provide rotational energy to at least one of an implement, a cutter, a mower, a harvester, a separator, and a thresher.

Figure 6:
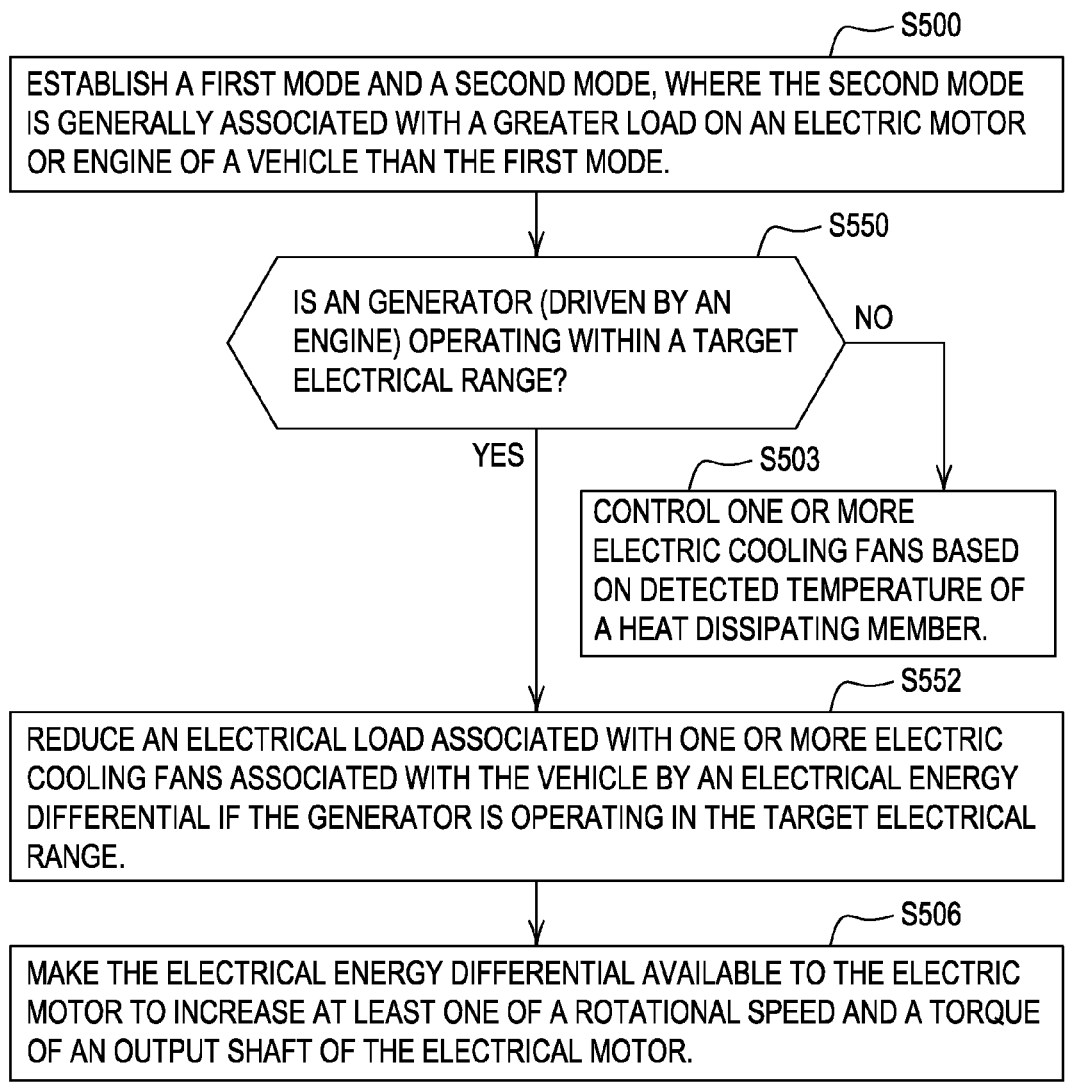
FIG. 6 is a flow chart of another embodiment of a method for managing electrical power for a vehicle.

FIG. 6 describes a method for managing electrical power for a vehicle. Like reference numbers in FIG. 5 and FIG. 6 indicate like steps or procedures. The method of FIG. 5 begins in step S500.

In step S500, a power management controller 52 establishes a first mode and a second mode, where the second mode is generally associated with a greater load on an electric motor or engine 34 of a vehicle than the first mode.

In step S550, a detector 58 determines whether a generator (e.g., 36 or 136) driven by an engine 34 is operating within a target electrical range. The target electrical range may refer to one or more of the following: a detected voltage level meeting or exceeding a threshold voltage level, a detected current level meeting or exceeding a threshold current level, a detected power level meeting or exceeding a threshold power level, a voltage range, a current range, and a power range. A range may be defined by a lower limit and an upper limit. If the generator (e.g., motor/generator 36 or generator 136) is operating within the target electrical range, the method continues with step S552. However, if the generator (e.g., motor/generator 36 or generator 136) is not operating within the target electrical range, the method continues with step S503.

In step S503, the power management controller 52, the fan motor controller 24, or both control one or more electric cooling fans (14, 16, 18, 20 and 22) based on detected temperature of a heat dissipating member. The heat dissipating member may comprise one or more of the following: an engine 34, an electric motor, a radiator, an engine oil cooler, a transmission oil cooler, an air conditioner condenser, a heat sink, and an electronic cooling fan. The detected temperature may be detected by a thermal sensor 28, a thermometer, a thermostat, a thermister, or another device that changes a physical or electrical property based on a change in temperature.

In step S552, a power management controller 52, a fan motor controller 24, or both reduce an electrical load associated with one or more electric cooling fans (14, 16, 18, 20 and 22) associated with the vehicle by at electrical energy differential if the generator (36 or 136) is operating in the target electrical range.

In an alternate procedure for carrying out step S552, the power management controller 52, a motor controller 24, or both may deactivate an air-conditioning motor that drives a compressor 50 to conserve additional energy and further reduce the electrical load.

In step S506, a power management controller 52 or an energy storage device 42 makes the electrical energy differential available to the electric motor (e.g., motor 54 or motor/generator 36) to increase at least one of a rotational speed and a torque of an output shaft of the electric motor (e.g., motor 54 or motor generator 36).

Figure 7:
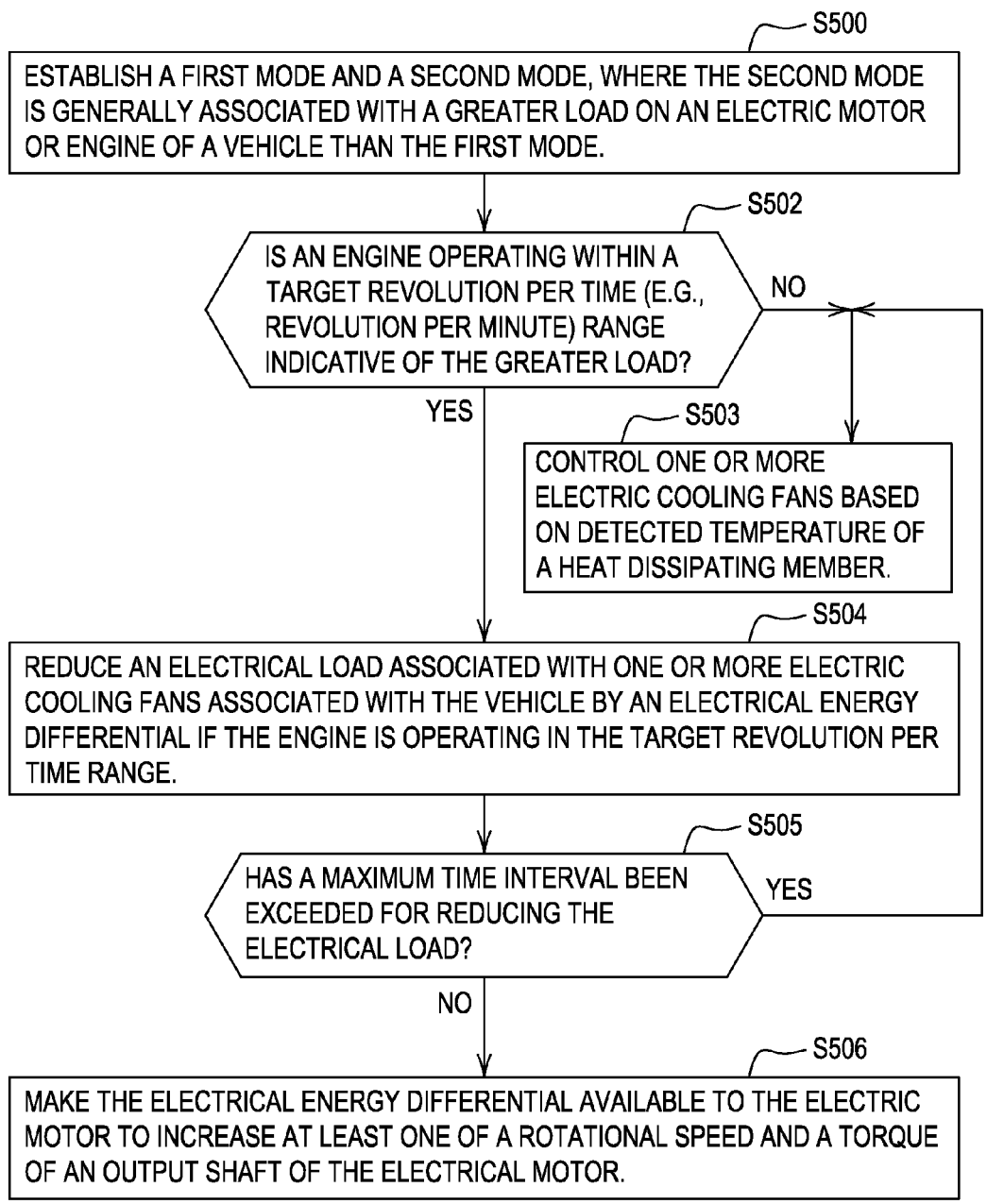
FIG. 7 is a flow chart of yet another embodiment of a method for managing electrical power for a vehicle.

The method of FIG. 7 is similar to the method of FIG. 5, except the method of FIG. 7 further includes step S505. Like reference numbers in FIG. 5 and FIG. 7 indicate like elements.

Step S505 follows step S504. In step S505, a power management controller 52 or a detector 58 determines whether a maximum time interval has been exceeded for reducing the electrical load. A timer may be integrated into the power management controller 52 or the detector 58 to track a maximum time interval or time period starting from a time in which the power management controller 52, the fan motor controller 24, or both reduce electrical load (e.g., by deactivating or turning off one or more cooling fans (14, 16, 18, 20, 22) via corresponding switches 26). Under one procedure for executing step S505, the power management controller 52 may limit operation in the second mode to a maximum time limit or duty cycle based on heat dissipation and ambient temperature associated with the vehicle. If the maximum time interval (for reducing the electrical load) has been exceeded, the method continues with step S503. However, if the maximum time interval has not been exceed, the method continues with step S506.

In step S506, a power management controller 52 makes an electrical energy differential available to the electric motor (e.g., 36 or 136) to increase at least one of a rotational speed and a torque of an output shaft of the electric motor (e.g., 36 or 136). In addition, the power management controller 52 may make a supplemental energy differential (e.g., associated with reducing power consumption and air-conditioning of the air conditioning system) available to the electric motor to increase at least one of a rotational speed and a torque of the an output shaft of the electric motor. The supplemental energy differential is available or accrued by deactivating a compressor motor 48 that drives a compressor 50 of an air conditioning system. In one example, the electric motor comprises a drive motor (36 or 136) for directly or indirectly driving one or more wheels, tracks, propellers, turbines, or a propulsion member of a vehicle directly or via a transmission or gear assembly. In another example, the electric motor is arranged to provide rotational energy to an electrically driven power takeoff shaft (PTO) of the vehicle. For instance, the electric motor is arranged to provide rotational energy to at least one of an implement, a cutter, a mower, a harvester, a separator, and a thresher.

Figure 8:
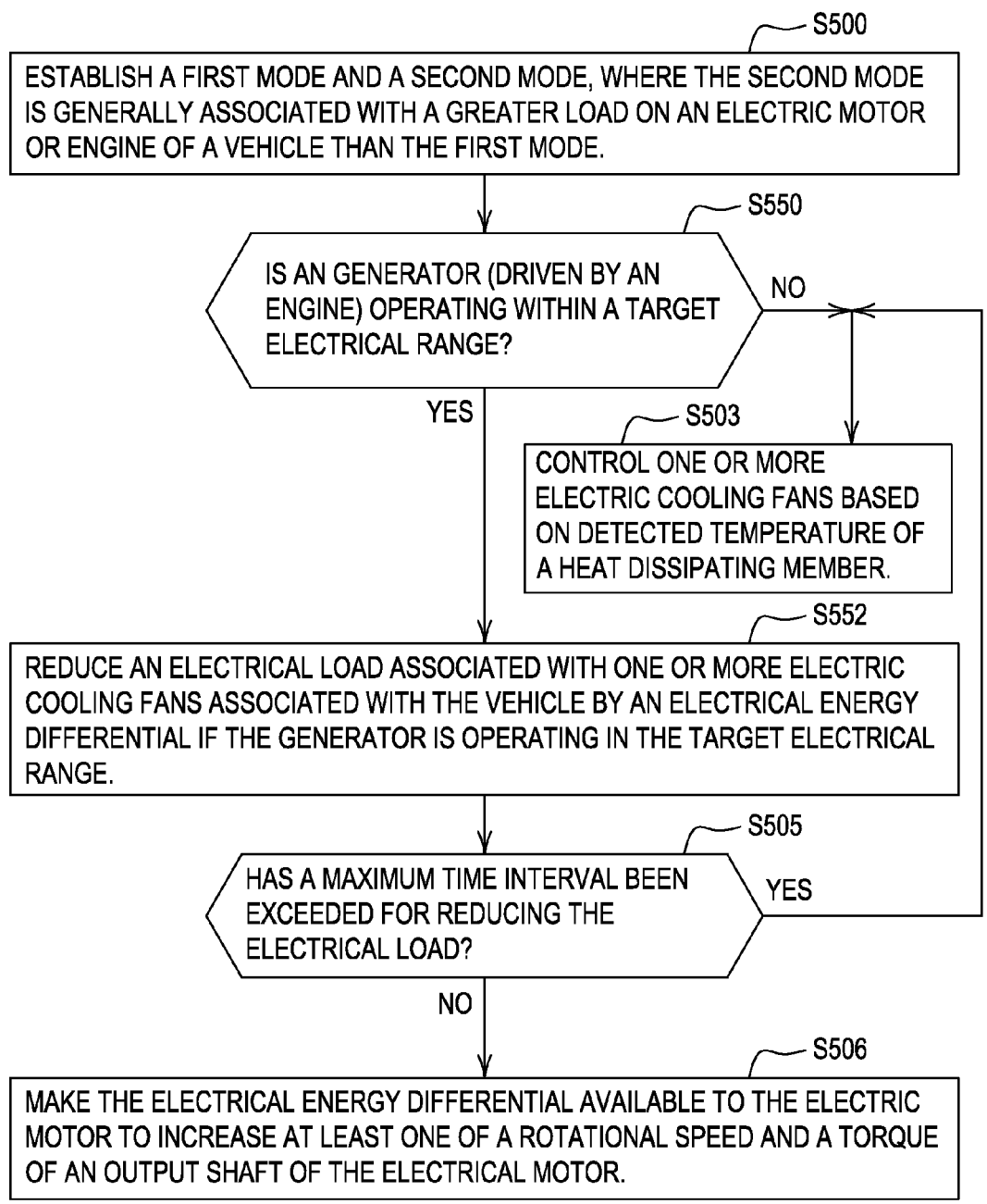
FIG. 8 is a block diagram of still another embodiment of a system for managing electrical power for a vehicle.

The method of FIG. 8 is similar to the method of FIG. 6, except the method of FIG. 8 further includes step S505. Like reference numbers in FIG. 6 and FIG. 8 indicate like steps or procedures.

Step S505 follows step S5552. In step S505, a power management controller 52 or a detector 58 determines whether a maximum time interval has been exceeded for reducing the electrical load. A timer may be integrated into the power management controller 52 or the detector 58 to track a maximum time interval or time period starting from a time in which the power management controller 52, the fan motor controller 24, or both reduce electrical load (e.g., by deactivating or turning off one or more cooling fans (14, 16, 18, 20, 22) via corresponding switches 26). Under one procedure for executing step S505, the power management controller 52 may limit operation in the second mode to a maximum time limit or duty cycle based on heat dissipation and ambient temperature associated with the vehicle. If the maximum time interval (for reducing the electrical load) has been exceeded, the method continues with step S503. However, if the maximum time interval has not been exceed, the method continues with step S506.

In step S506, a power management controller 52 makes an electrical energy differential available to the electric motor (e.g., 36 or 136) to increase at least one of a rotational speed and a torque of an output shaft of the electric motor (e.g., 36 or 136). In addition, the power management controller 52 may make a supplemental energy differential (e.g., associated with reducing power consumption and air-conditioning of the air conditioning system) available to the electric motor to increase at least one of a rotational speed and a torque of the an output shaft of the electric motor. The supplemental energy differential is available or accrued by deactivating a compressor motor 48 that drives a compressor 50 of an air conditioning system. In one example, the electric motor comprises a drive motor (36 or 136) for directly or indirectly driving one or more wheels, tracks, propellers, turbines, or a propulsion member of a vehicle directly or via a transmission or gear assembly. In another example, the electric motor is arranged to provide rotational energy to an electrically driven power takeoff shaft (PTO) of the vehicle. For instance, the electric motor is arranged to provide rotational energy to at least one of an implement, a cutter, a mower, a harvester, a separator, and a thresher.

FIG. 9 illustrates one embodiment of a method for managing electrical power of a vehicle. The method of FIG. 9 may be applied to any embodiment of the system (11, 111, 211 or 311 of FIG. 1 through FIG. 4, inclusive) described herein, or other embodiments that fall within the scope of this document. The method of FIG. 9 begins in step S202.

In step S202, a speed sensor 32, detector 58 or power management controller 52 determines if the engine 34 speed of the engine 34 is below a speed set point (e.g., revolutions per unit time of a crankshaft or other shaft) for a minimum duration. The minimum duration may represent a factory setting, a user-definable setting, a technician definable setting, or the like. In one embodiment, the speed sensor 32 may provide an analog signal, a digital signal or a data message to the power management controller 52 that indicates one or more of the following: an engine speed, an engine speed below the speed set point, a revolution per unit time (e.g., revolution per minute) measurement, an alert data message, or a status data message. In another embodiment, a detector 58, a voltage level meter, a current level meter, or an electrical energy level detector may be used to estimate the engine speed of the engine 34 from the electrical energy output (e.g., voltage, current or power level) outputted by the generator 136 (or motor/generator 36) coupled to the engine 34. If the engine speed is detected to be below the speed set point for a minimum duration, the method continues with step S204. However, if the engine speed is detected to be at or above the speed set point, the method continues with step S206.

In step S206, the system (11, 111, 211 or 311) waits for a time interval prior to executing step S202 again. For example, the speed sensor 32, detector 58 or power management controller 52 waits for a time interval prior to executing step S202 again.

In step S204, a thermal sensor 28 determines if a first detected temperature (e.g., first coolant temperature) associated with a first cooling fan 14, a first coolant, or a first vehicle component is below a first target temperature (e.g., a sub-cooled target temperature, an intermediate target temperature, or a maximum target temperature). The first cooling fan 14 may be configured to cool or provide air circulation to a first vehicle component (e.g., an engine 34 or radiator). In one example, the first cooling fan 14 may comprise a cooling fan for an engine 34 or a radiator for a coolant-cooled engine 34 or water-cooled engine 34. In another example, the first cooling fan 14 may comprise a cooling fan for an oil pan, air-cooled cylinders, or finned cylinders for an air-cooled engine configuration.

In one embodiment, the first target temperature represents a factory setting, a pre-programmed setting, or a technician modifiable setting that depends upon the corresponding vehicle component to be cooled. For example, each different first vehicle component (e.g., radiator) may have a corresponding first target temperature, which further may be classified as a sub-cooled target temperature, an intermediate target temperature or a maximum target temperature, as previously defined herein. If the first detected temperature is below the first target temperature, the method continues with step S208. However, if the first detected temperature is not below the first target temperature, the method continues with step S210.

In step S208, fan motor controller 24 or the power management controller 52 stops, disables, deactivates or slows the first cooling fan 14 to conserve electrical energy (e.g., a first level of electrical energy). In one embodiment, the conserved electrical energy or first level of electrical energy is associated with the electrical power or electrical work saved by stopping, disabling or slowing the first cooling fan 14. For example, if the fan motor 29 is stopped or disabled, the first level of electrical energy may approximately equal the power consumption of the fan during the duration of the stoppage or disablement. The conserved electrical work or energy may be measured based on both the conserved power consumption and the duration of the stoppage or disablement.

In step S210, a thermal sensor 28 determines if a second detected temperature (e.g., second coolant temperature) associated with a second cooling fan 16, a second coolant or a second vehicle component is below a second target temperature (e.g., a sub-cooled target temperature, an intermediate target temperature, or a maximum target temperature). The second cooling fan 16 may be configured to cool or provide air circulation to a second vehicle component (e.g., an engine oil reservoir or an engine oil pan). In one example, the second cooling fan 16 may comprise a cooling fan for an engine oil reservoir, an engine oil pan, or an oil radiator, or oil cooler for an air-cooled or coolant cooled engine. If the second detected temperature is below the second target temperature, the method continues with step S212. However, if the second detected temperature is not below the second target temperature, the method continues with step S214.

In step S212, fan motor controller 24 or the power management controller 52 stops, disables, deactivates or slows the second cooling fan 16 to conserve electrical energy (e.g., a second level of electrical energy). In one embodiment, the conserved electrical energy or second level of electrical energy is associated with the electrical power or electrical work saved by stopping, disabling or slowing the second cooling fan 16. For example, if the fan motor 29 is stopped or disabled the first level of electrical energy may approximately equal the power consumption of the fan during the duration of the stoppage or disablement. The conserved electrical work or energy may be measured based on both the conserved power consumption and the duration of the stoppage or disablement.

In step S214, the speed sensor 32, detector 58 or power management controller 52 determines whether the engine 34 speed recovered to the set point (e.g., the established set point of step S202) for a threshold period. If the engine speed has recovered to the set point for a threshold period, the method continues with step S216. However, if the engine 34 speed has not recovered to the set point for a threshold period, the method continues with step S218.

In step S216, the power management controller 52 or the fan motor controller 24 starts, activates, enables or increases the speed of the first cooling fan 14 and the second cooling fan 16 to reach a first desired temperature and a second desired temperature, respectively. The first desired temperature may be equal to the first target temperature or another temperature below the current temperature of the first coolant by a certain amount, for example. The second desired temperature may be equal to the second target temperature or another temperature below the current temperature of the second coolant by a certain amount, for example. The certain amount (below the target temperature) may be a constant, a quantity that varies proportionally with the ambient temperature, or an output of an equation that considers the ambient temperature and other thermal factors or thermodynamic factors associated with the engine or its associated electrical components. After executing step S216, the method generally returns to step S202 to continue. Although the outcome of step S214 determines whether or not step S216 is executed or not, it should be noted that step S216 may also be executed following step S224 in certain circumstances as set forth in the flow chart.

In step S218, a thermal sensor 28 detects whether a third detected temperature (e.g., a third coolant temperature) associated with a third cooling fan 18, a third coolant or a third vehicle component is below a third target temperature (e.g., a sub-cooled target temperature, an intermediate target temperature, or a maximum target temperature). The third cooling fan 18 may be configured to cool or provide air circulation to a third vehicle component (e.g., a transmission oil reservoir, transmission oil pan, hydraulic fluid reservoir, hydraulic fluid pan, transmission oil cooler or hydraulic oil cooler). In one example, the third cooling fan 18 may comprise a hydraulic oil cooling fan or a transmission oil cooling fan for a transmission oil reservoir, a transmission oil pan, a hydraulic fluid reservoir, a hydraulic fluid pan, a transmission oil cooler, or a hydraulic oil cooler. If the third detected temperature is below the third target temperature, the method continues with step S220. However, if the third detected temperature is not below the third target temperature, the method continues with step S232.

In step S220, the power management controller 52 or the fan motor controller 24 stops, disables, deactivates or slows the third cooling fan 18 to conserve electrical energy (e.g., a third level) of electrical energy.

In step S222, the speed sensor 32, the power management controller 52, or the detector 58 determines if the engine speed has recovered to the set point for a threshold period. In one embodiment, the speed set point for steps S202, S214, and S222 are the same or substantially the same. Although the threshold period may equal or exceed the minimum duration, the threshold period may exceed the minimum duration. If the engine speed has recovered to the set point for a threshold period, the method continues with step S224. However, if the engine speed has not recovered to the set point for a threshold period, the method continues with step S232.

In step S224, the power management controller 52 or the fan motor controller 24 starts, enables, activates or increases the speed of a third cooling fan 18 to reach a third desired temperature. The third desired temperature may be equal to the third target temperature, or may be below the third target temperature by a certain amount. The certain amount (below the target temperature) may be a constant, a quantity that varies proportionally with the ambient temperature, or an output of an equation that considers the ambient temperature and other thermal factors or thermodynamic factors associated with the engine or its associated electrical components.

In step S232, the power management controller 52 or the air-conditioning controller 46 (i.e., AC controller) disables at least one of the air-conditioning compressor, an air-conditioning motor 48, or an air-conditioning clutch that for a time period to conserve a fourth level of electrical energy. Step S226 follows step S232.

In an alternate embodiment of step S232, the power management controller 52, or the fan motor controller 24 may deactivate or turn off the fourth cooling fan 20 associated with a condenser or heat dissipating element of an air-conditioning system of the vehicle for a time period. The fourth cooling fan 20 may be deactivated or turned off cumulatively with or independently of turning off the air-conditioner compressor or deactivating the air-conditioner clutch for a time period. Accordingly, the conserved fourth energy level may include the electrical energy conserved by both the deactivation of the air-conditioning motor 48 that drives the air-conditioning compressor and the deactivation of the fourth cooling fan 20 that cools the condenser of the air-conditioning system of the vehicle.

In step S226, the power management controller 52 determines whether the cumulative conserved electrical energy is equal to a target threshold for a threshold time period. If the cumulative conserved energy is equal to a target threshold for a threshold time period, the method continues with step S228. However, if the cumulative conserved energy is not equal to a target threshold for a threshold time period, the method continues with step S234.

In step S228, the power management controller 52, or the air-conditioning controller 46 enables, turns on, starts, or activates an air-conditioning compressor 50, an air-conditioning motor 48, or an air-conditioning clutch.

In step S234, the power management controller 52, or a timer associated therewith, waits for a time interval that allows for additional energy to be conserved associated with a direction of the air-conditioning for the additional duration of the time interval. Step S234 may be executed in accordance with several techniques that may be applied alternately, cumulatively, or both.

Under a first technique, the time interval is selected to be sufficient for the cumulative conserved electrical energy to equal a target threshold for a threshold time period. The time interval may depend upon the state of health of the energy storage device 42, the state of charge of the energy storage device 42 and the present load on the energy storage device 42, the DC-DC converter 30 or the electrical system (11, 111, 211 or 311) in general.

Under a second technique, the time interval may or may not be sufficient for the cumulative conserved electrical energy to equal a target threshold for a threshold time period so long as the cumulative conserved electrical energy tends to be increased during the time interval. Here, under the second technique, the time interval may be selected with one or more of the following assumptions: (1) the energy storage device 42 has a good state of health (e.g., the energy can store at least half of its new storage, as-manufactured storage capacity, or full storage capacity and supply the stored energy to a load) (2) the present load on the energy storage device 42 is equal to or less than a target operational load, or (3) the present load on the energy storage device 42 is equal to or less than a target operational load for a give continuous or intermittent duty cycle.

The method of FIG. 10 is similar to the method of FIG. 9, except step S203 is added after step S202 and step S232 is deleted. Like reference numbers in FIG. 9 and FIG. 10 indicate like steps or procedures.

In step S202, a speed sensor 32, detector 58 or power management controller 52 determines if the engine 34 speed of the engine 34 is below a speed set point for a minimum duration. The minimum duration may represent a factory setting, a user-definable setting, a technician definable setting, or the like. In one or more embodiments, the speed sensor 32 or detector 58 may provide an analog signal, a digital signal or a data message to the power management controller 52 that indicates one or more of the following: an engine speed, an engine speed below the set point, a revolution per unit time (e.g., revolution per minute) measurement, an alert data message, or a status data message. In another embodiment, a voltage level meter, a current level meter, or an electrical energy level detector may be used to estimate the engine speed of the engine 34 from the energy output (e.g., voltage, current or power level) outputted by the generator 136 or motor/generator 36 coupled to the engine 34.

If the engine 34 speed is detected to be below the speed set point for a minimum duration, the method continues with step S203. However, if the engine 34 speed is detected to be at or above the speed set point, the method continues with step S206.

In step S206, the speed sensor 32 or power management controller 52 waits for a time interval prior to executing step S202 again.

In step S203, a power management controller 52 or an air-conditioning controller 46 disables, deactivates or turns off at least one of an air-conditioning compressor 50, an air-conditioning motor 48, or an air-conditioning clutch for a time interval to conserve electrical energy (e.g., a fourth level of electrical energy). The air-conditioning motor 48 may be used for an electrically driven air-conditioning compressor 50, whereas the air-conditioning clutch may be used for a mechanically driven air-conditioning compressor.

In an alternate embodiment of step S203, the power management controller 52 or the fan motor controller 24 may disable, deactivate or turn off the fourth cooling fan 20 associated with a condenser or heat dissipating unit (e.g., heat sink or radiating coils) of an air-conditioning system of the vehicle for a time period. The fourth cooling fan 20 may be deactivated, disabled, or turned off cumulatively with or independently of disabling the air-conditioning motor 48, the air-conditioning compressor 50, or the air-conditioning clutch for a time period. Accordingly, the conserved fourth energy level may include the electrical energy conserved by both the deactivation of the air-conditioning motor 48 that drives the air-conditioning compressor 50 and the deactivation of the fourth cooling fan 20 that cools the condenser or heat dissipating unit of the air-conditioning system of the vehicle.

As shown in FIG. 10, after step S203 is executed, the method continues with step S204. However, in another alternate embodiment, step S203 and step S204 may be executed simultaneously or substantially simultaneously.

In step S204, a thermal sensor 28 determines if a first detected temperature (e.g., first coolant temperature) associated with a first cooling fan 14, a first coolant, or a first vehicle component is below a first target temperature (e.g., a sub-cooled target temperature, an intermediate target temperature, or a maximum target temperature). The first cooling fan 14 may be configured to cool or provide air circulation to a first vehicle component (e.g., an engine 34 or radiator). In one example, the first cooling fan 14 may comprise a cooling fan for an engine 34 or a radiator for a coolant-cooled engine 34 or water-cooled engine 34. In another example, the first cooling fan 14 may comprise a cooling fan for an oil pan, air-cooled cylinders, or finned cylinders for an air-cooled engine configuration.

In one embodiment, the first target temperature represents a factory setting, a pre-programmed setting, or a technician modifiable setting that depends upon the corresponding vehicle component to be cooled. For example, each different first vehicle component (e.g., radiator) may have a corresponding first target temperature, which further may be classified as a sub-cooled target temperature, an intermediate target temperature or a maximum target temperature. If the first detected temperature is below the first target temperature, the method continues with step S208. However, if the first detected temperature is not below the first target temperature, the method continues with step S210.

In step S208, fan motor controller 24 or the power management controller 52 stops, disables, deactivates or slows the first cooling fan 14 to conserve electrical energy (e.g., a first level of electrical energy). In one embodiment, the conserved electrical energy or first level of electrical energy is associated with the electrical power or electrical work saved by stopping, disabling or slowing the first cooling fan 14. For example, if the fan motor 29 is stopped or disabled, the first level of electrical energy may approximately equal the power consumption of the fan during the duration of the stoppage or disablement. The conserved electrical work or energy may be measured based on both the conserved power consumption and the duration of the stoppage or disablement.

In step S210, a thermal sensor 28 determines if a second detected temperature (e.g., second coolant temperature) associated with a second cooling fan 16, a second coolant or a second vehicle component is below a second target temperature (e.g., a sub-cooled target temperature, an intermediate target temperature, or a maximum target temperature). The second cooling fan 16 may be configured to cool or provide air circulation to a second vehicle component (e.g., an engine oil reservoir or an engine oil pan). In one example, the second cooling fan 16 may comprise a cooling fan for an engine oil reservoir, an engine oil pan, or an oil radiator, or oil cooler for an air-cooled or coolant cooled engine. If the second detected temperature is below the second target temperature, the method continues with step S212. However, if the second detected temperature is not below the second target temperature, the method continues with step S214.

In step S212, fan motor controller 24 or the power management controller 52 stops, disables, deactivates or slows the second cooling fan 16 to conserve electrical energy (e.g., a second level of electrical energy). In one embodiment, the conserved electrical energy or second level of electrical energy is associated with the electrical power or electrical work saved by stopping, disabling or slowing the second cooling fan 16. For example, if the fan motor 29 is stopped or disabled the first level of electrical energy may approximately equal the power consumption of the fan during the duration of the stoppage or disablement. The conserved electrical work or energy may be measured based on both the conserved power consumption and the duration of the stoppage or disablement.

In step S214, the speed sensor 32, detector 58 or power management controller 52 determines whether the engine 34 speed recovered to the set point (e.g., the established set point of step S202) for a threshold period. If the engine speed has recovered to the set point for a threshold period, the method continues with step S216. However, if the engine 34 speed has not recovered to the set point for a threshold period, the method continues with step S218.

In step S216, the power management controller 52 or the fan motor controller 24 starts, activates, enables or increases the speed of the first cooling fan 14 and the second cooling fan 16 to reach a first desired temperature and a second desired temperature, respectively. The first desired temperature may be equal to the first target temperature or another temperature below the current temperature of the first coolant by a certain amount, for example. The second desired temperature may be equal to the second target temperature or another temperature below the current temperature of the second coolant by a certain amount, for example. The certain amount (below the target temperature) may be a constant, a quantity that varies proportionally with the ambient temperature, or an output of an equation that considers the ambient temperature and other thermal factors or thermodynamic factors associated with the engine or its associated electrical components. After executing step S216, the method generally returns to step S202 to continue. Although the outcome of step S214 determines whether or not step S216 is executed or not, it should be noted that step S216 may also be executed following step S224 in certain circumstances as set forth in the flow chart.

In step S218, a thermal sensor 28 detects whether a third detected temperature (e.g., a third coolant temperature) associated with a third cooling fan 18, a third coolant, and a third vehicle component is below a third target temperature (e.g., a sub-cooled target temperature, an intermediate target temperature, or a maximum target temperature). The third cooling fan 18 may be configured to cool or provide air circulation to a third vehicle component (e.g., a transmission oil reservoir, transmission oil pan, hydraulic fluid reservoir, hydraulic fluid pan, transmission oil cooler or hydraulic oil cooler). In one example, the third cooling fan 18 may comprise a hydraulic oil cooling fan or a transmission oil cooling fan for a transmission oil reservoir, a transmission oil pan, a hydraulic fluid reservoir, a hydraulic fluid pan, a transmission oil cooler, or a hydraulic oil cooler. If the third detected temperature is below the third target temperature, the method continues with step S220. However, if the third detected temperature is not below the third target temperature, the method continues with step S226.

In step S220, the power management controller 52 or the fan motor controller 24 stops, disables, deactivates or slows the third cooling fan 18 to conserve electrical energy (e.g., a third level) of electrical energy.

In step S222, the speed sensor 32, the power management controller 52, or the detector 58 determines if the engine speed has recovered to the set point for a threshold period. In one embodiment, the speed set point for steps S202, S214, and S222 are the same or substantially the same. Although the threshold period may equal or exceed the minimum duration, the threshold period may exceed the minimum duration. If the engine speed has recovered to the set point for a threshold period, the method continues with step S224. However, if the engine speed has not recovered to the set point for a threshold period, the method continues with step S226.

In step S224, the power management controller 52 or the fan motor controller 24 starts, enables, activates or increases the speed of a third cooling fan 18 to reach a third desired temperature. The third desired temperature may be equal to the third target temperature, or may be below the third target temperature by a certain amount. The certain amount (below the target temperature) may be a constant, a quantity that varies proportionally with the ambient temperature, or an output of an equation that considers the ambient temperature and other thermal factors or thermodynamic factors associated with the engine or its associated electrical components.

In step S232, the power management controller 52 or the air-conditioning controller 46 (i.e., AC controller) disables at least one of the air-conditioning compressor, an air-conditioning motor 48, or an air-conditioning clutch that for a time period to conserve a fourth level of electrical energy. Step S226 follows step S232.

In an alternate embodiment of step S232, the power management controller 52, or the fan motor controller 24 may deactivate or turn off the fourth cooling fan 20 associated with a condenser or heat dissipating element of an air-conditioning system of the vehicle for a time period. The fourth cooling fan 20 may be deactivated or turned off cumulatively with or independently of turning off the air-conditioner compressor or deactivating the air-conditioner clutch for a time period. Accordingly, the conserved fourth energy level may include the electrical energy conserved by both the deactivation of the air-conditioning motor 48 that drives the air-conditioning compressor and the deactivation of the fourth cooling fan 20 that cools the condenser of the air-conditioning system of the vehicle.

In step S226, the power management controller 52 determines whether the cumulative conserved electrical energy is equal to a target threshold for a threshold time period. If the cumulative conserved energy is equal to a target threshold for a threshold time period, the method continues with step S228. However, if the cumulative conserved energy is not equal to a target threshold for a threshold time period, the method continues with step S234.

In step S228, the power management controller 52, or the air-conditioning controller 46 enables, turns on, starts, or activates an air-conditioning compressor 50, an air-conditioning motor 48, or an air-conditioning clutch.

In step S234, the power management controller 52, or a timer associated therewith, waits for a time interval that allows for additional energy to be conserved associated with a direction of the air-conditioning for the additional duration of the time interval. Step S234 may be executed in accordance with several techniques that may be applied alternately, cumulatively, or both.

Under a first technique, the time interval is selected to be sufficient for the cumulative conserved electrical energy to equal a target threshold for a threshold time period. The time interval may depend upon the state of health of the energy storage device 42, the state of charge of the energy storage device 42 and the present load on the energy storage device 42, the DC-DC converter 30 or the electrical system (11, 111, 211 or 311) in general.

Under a second technique, the time interval may or may not be sufficient for the cumulative conserved electrical energy to equal a target threshold for a threshold time period so long as the cumulative conserved electrical energy tends to be increased during the time interval. Here, under the second technique, the time interval may be selected with one or more of the following assumptions: (1) the energy storage device 42 has a good state of health (e.g., the energy can store at least half of its new storage, as-manufactured storage capacity, or full storage capacity and supply the stored energy to a load) (2) the present load on the energy storage device 42 is equal to or less than a target operational load, or (3) the present load on the energy storage device 42 is equal to or less than a target operational load for a give continuous or intermittent duty cycle.

Having described the preferred embodiment, it will become apparent that various modifications can be made without departing from the scope of the invention as defined in the accompanying claims.

The following is claimed:

1. A method for managing the electrical power associated with a vehicle including an engine, a generator coupled to the engine, and an electric motor powered by the generator, the method comprising:
    detecting whether the engine is operating within a target range of revolutions per unit time for a time period, and if so, the engine is determined to have an increased load;
    responsive to determining that the engine has the increased load, a power management controller reducing at least one electrical load associated with at least one cooling fan by disabling, or decreasing the speed of, the at least one cooling fan to make an electrical energy differential available to the electric motor in a power diversion mode;
    timing how long the at least one cooling fan has been disabled or slowed in the power diversion mode; and
    controlling, via the power management controller, the at least one cooling fan based on a detected temperature of a heat dissipating member when a maximum time duration for disabling or slowing the at least one cooling fan in the power diversion mode has elapsed while the engine continues to operate within the target range.

2. The method according to claim 1 wherein the at least one cooling fan comprises at least one of an engine fan, a transmission oil cooling fan, or an engine oil cooling fan.

3. The method according to claim 1 further comprising:
    before the maximum time duration has elapsed, controlling the at least one cooling fan based on the detected temperature of the heat dissipating member if the engine no longer operates within the target range of revolutions per unit time.

4. The method according to claim 1 further comprising:
    the power management controller controlling an air-conditioner to reduce electrical power available to the air-conditioner when the power management controller reduces the at least one electrical load associated with the at least one cooling fan in the power diversion mode.

5. The method according to claim 4 further comprising:
    the power management controller controlling the air-conditioner to increase power available to the air-conditioner when the power management controller enables, or increases the speed of, the at least one cooling fan.

6. The method according to claim 1, wherein the at least one cooling fan comprises a plurality of cooling fans.

7. The method according to claim 1, wherein the electrical energy differential available to the electric motor increases at least one of a rotational speed or a torque of the electric motor.

8. The method according to claim 1 wherein the electric motor drives directly or indirectly one or more wheels or tracks or a propulsion member.

9. The method according to claim 1 wherein the electric motor drives a power takeoff shaft or is arranged to provide rotational energy to at least one of an implement, a cutter, a mower, a harvester, a separator, or a thresher.

10. The method according to claim 1 wherein the detecting that the engine is operating within the target range of revolutions per unit time for the time period indicates the engine is approaching a peak load condition.

* * * * *